US 006726431B2

(12) United States Patent
Morrell

(10) Patent No.: US 6,726,431 B2
(45) Date of Patent: Apr. 27, 2004

(54) CONTAINER HANDLING SYSTEM AND METHOD

(76) Inventor: Jay C. Morrell, 10054 Ickler Ave., NE., Monticello, MN (US) 55362

( * ) Notice: Subject to any disclaimer, the term of this patent is extended or adjusted under 35 U.S.C. 154(b) by 0 days.

(21) Appl. No.: 09/829,111

(22) Filed: Apr. 9, 2001

(65) Prior Publication Data

US 2002/0146306 A1 Oct. 10, 2002

(51) Int. Cl.$^7$ ................. B60F 1/48; B60F 1/64
(52) U.S. Cl. ............ 414/340; 414/343; 414/345; 414/812; 298/8 R; 298/8 T
(58) Field of Search ............... 414/498, 340, 414/481, 482, 483, 484, 491, 492, 339, 343, 345, 812; 298/8 R, 8 T

(56) References Cited

U.S. PATENT DOCUMENTS

| | | | | |
|---|---|---|---|---|
| 2,478,658 A | * | 8/1949 | Harbers ................. 414/345 |
| 2,494,735 A | * | 1/1950 | Ambarcumian | |
| 2,846,267 A | * | 8/1958 | Fields ................... 414/8 T |
| 3,083,850 A | * | 4/1963 | Owen ................. 414/484 X |
| 3,193,330 A | * | 7/1965 | Hribar, Jr. ............. 298/8 R |
| 3,486,645 A | * | 12/1969 | Hearn ................... 414/339 |
| 4,802,811 A | | 2/1989 | Nijenhuis ............... 414/478 |
| 4,915,567 A | * | 4/1990 | Ellingsen ............... 414/345 |
| 4,986,719 A | | 1/1991 | Galbreath ............... 414/478 |
| 5,088,875 A | | 2/1992 | Galbreath et al. ........ 414/478 |
| 5,326,215 A | * | 7/1994 | Eberhardt .............. 414/563 |
| 5,531,559 A | | 7/1996 | Kruzick ................ 414/498 |
| 5,542,807 A | | 8/1996 | Kruzick ................ 414/491 |
| 5,662,450 A | * | 9/1997 | Roberts ............. 414/498 M |

FOREIGN PATENT DOCUMENTS

| | | | | |
|---|---|---|---|---|
| EP | 446388 | * | 9/1991 | .......... 414/498 |
| JP | 6181830 | * | 4/1986 | .......... 414/345 |
| RU | 1641669 | * | 4/1991 | .......... 414/340 |
| WO | 93/18934 | * | 9/1993 | .......... 414/491 |

* cited by examiner

Primary Examiner—Steven A. Bratlie
(74) Attorney, Agent, or Firm—Moore, Hansen & Sumner

(57) ABSTRACT

A container handling system includes a vehicle adapted to carry a container, the vehicle being equipped with a hoist for lifting containers, and, a trailer towable by the vehicle so as to provide tandem transport of containers. The trailer is adapted to receive a container from the vehicle via the vehicle hoist, and is further adapted to selectively hoist a received container in furtherance of unloading the received container, or dump contents therefrom.

23 Claims, 5 Drawing Sheets

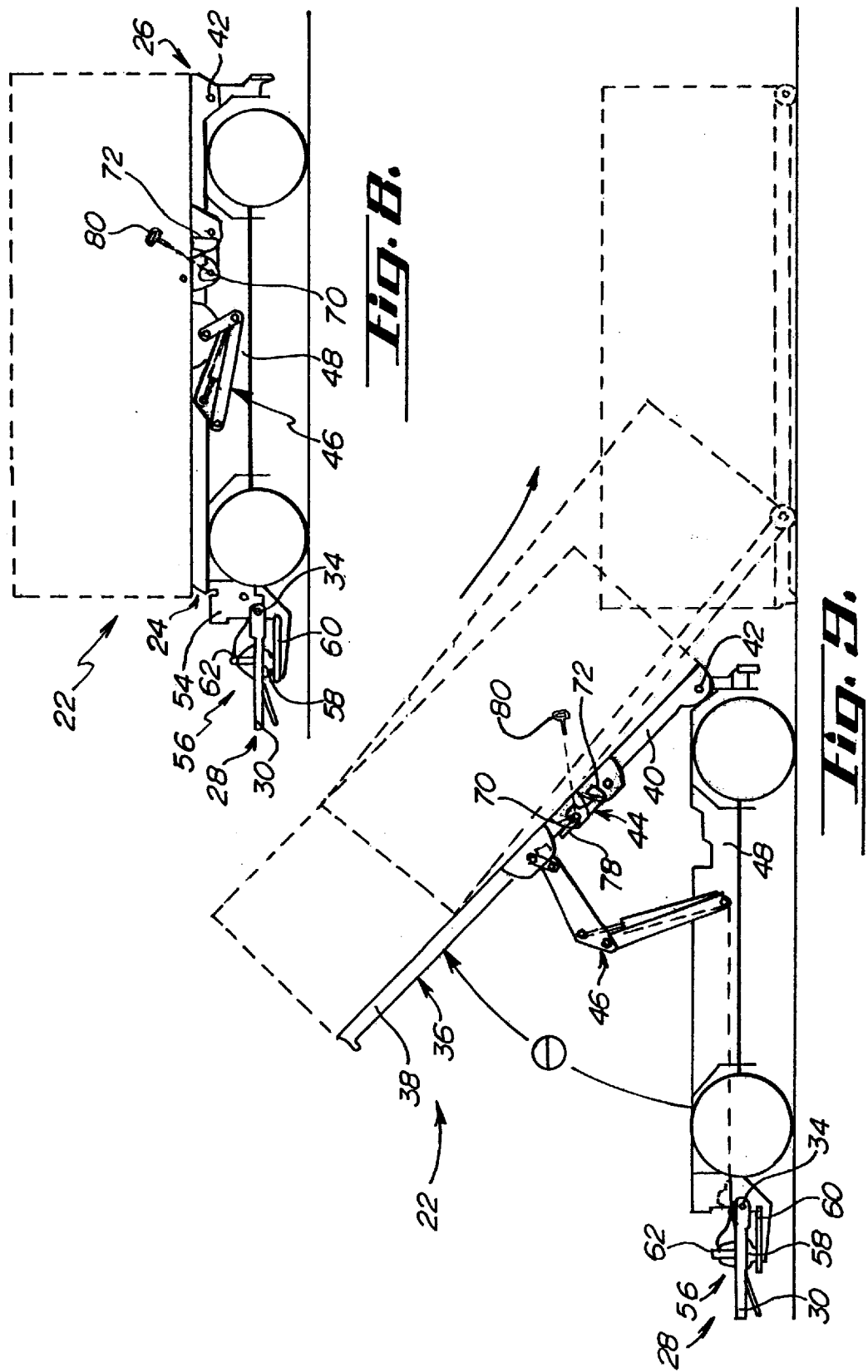

(54)

CONTAINER HANDLING SYSTEM AND METHOD

TECHNICAL FIELD

The present invention generally relates to the ground transport of transportable containers, and handling systems related thereto, more particularly to apparatus and methods associated with tandem container loading/unloading, or content dumping.

BACKGROUND OF INVENTION

A variety of container lift hoist styles are known for unloading containers from transport vehicles or the like. A great many of the styles include a container supporting surface which is tilted in furtherance of delivering the container to/at a work site. As supported by the numerous issued patents, and touted in the product literature for such devices, emphasis has heretofore been placed on the delivery, more particularly the unloading, of containers from transport vehicles, with numerous advances made concerning the mechanics associated therewith, and the safe operation thereof.

Tandem container transport generally provides for a more efficient container delivery and pick-up, conjuring up the notion of "two for the price of one." Be this as it may, such tandem container transport, more particularly, readying the transport vehicles for loading and unloading is cumbersome and time consuming. Typically a self loading truck is provided for hauling both a container (i.e., a "truck container") and a trailer loaded with a container (i.e., a "trailer container"). Such vehicles are commonly equipped with a hook style hoist, which in addition to having the capacity to load and unload truck containers, is capable of loading and unloading a trailer container from a trailer. Although this to some extent streamlines the loading and unloading process by eliminating a further loading/unloading apparatus from the process, typically a vehicle adapted for such purpose in addition to the vehicle and trailer combination, trailer ingress and egress can only be accomplished from the rear, as a trailer hitch assembly generally prevents access, or easy access. Such rear trailer loading requirement can be, and in fact is, prohibitive, as space to freely jockey about a job site is often times limited.

Arguably the most time consuming task associated with tandem container delivery is the unhooking of the trailer from the self loading vehicle so that the task of unloading the trailer container from the trailer may be completed, and thereafter, reconfiguring the units for tandem container transport. Although a variety of trailer hitching assembly styles are known, manipulation in furtherance of hooking and unhooking typically requires a jack or other multi-component lifting aid. Such task is especially time consuming for the single operator likely assigned to the tandem transporter. The intermediate steps of unhooking and re-hooking the trailer to the vehicle, when combined with the previously identified shortcomings, negate a great deal of the advantage gained by hauling tandem containers when compared to single container transport.

SUMMARY OF THE INVENTION

The container handling system of the present invention includes a vehicle adapted to carry a container, the vehicle being equipped with a hoist for lifting containers, and, a trailer towable by the vehicle so as to provide tandem transport of containers. The trailer is adapted to receive a container from the vehicle via the vehicle hoist, and is further adapted to selectively hoist a received container in furtherance of unloading the received container, or dump contents therefrom.

A container handling method for tandem container transport is likewise provided. A vehicle adapted to carry a container, and a trailer towable by the vehicle so as to permit tandem carriage of containers, is preliminarily provided in the method. The vehicle is preferably equipped with means for transferring the container from the vehicle, whereas the trailer is adapted to carry and unload a container therefrom. The vehicle is loaded with a container and subsequently transferred from the vehicle to the trailer via means for transferring the container from the vehicle.

BRIEF DESCRIPTION OF THE DRAWINGS

FIG. 8 depicts the trailer of FIG. 6 particularly showing the container in an unlocked condition upon the cradle in furtherance of container unloading;

FIG. 9 depicts the trailer of FIG. 8 wherein the trailer hoist has been activated so as to elevate a portion of the cradle relative to the chassis of the trailer in furtherance of container unloading or delivery;

DETAILED DESCRIPTION OF THE INVENTION

Figure 1:
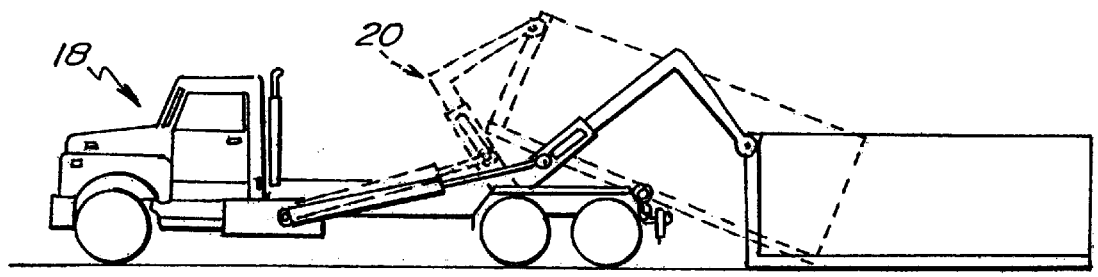
FIG. 1 depicts a self-propelled vehicle reversibly transferring a container, more particularly the loading/unloading of a container from the vehicle.

Referring generally to FIGS. 1–6, there is shown the container (e.g., a roll-off box) handling system 15 of the subject invention. The container handling system 15 includes a vehicle 18 adapted to carry a container, the vehicle 18 being equipped with a hoist 20 for lifting same, and a trailer 22 towable by the vehicle 18 so as to provide tandem transport of containers. The trailer 22 is adapted to receive a container from the vehicle 18 via the vehicle hoist 20, and is further adapted to selectively hoist a received container in furtherance of unloading the received container, or dump contents therefrom.

The trailer 22, which will be discussed in greater detail with reference to FIGS. 10–12, generally has forward 24 and rearward 26 portions, the forward portion 24 being equipped with a hitch assembly 28 for joining the trailer 22 to the vehicle 18. The hitch assembly 28 generally includes a forwardly extending draw bar 30 having a free end 32 pivotable about a pivot axis 34 (i.e., draw bar pivot). The draw bar 30 is preferably pneumatically actuated for pivot motion about the draw bar pivot 34 so as to selectively position the free end 32 thereof, and thereby facilitate selective reversible coupling of the trailer 22 to the vehicle 18 as may be required during container handling operations.

The trailer 22 further includes a cradle 36 for receiving a container. The cradle 36, like the trailer 22, has forward 38 (i.e., fore) and rearward 40 (i.e., aft) portions, with the rearward portion 40 of the cradle 36 being pivotably attached to the rearward portion 26 of the trailer 22 for pivot motion about a pivot axis 42 (i.e., cradle pivot). The cradle 36 is equipped with a container retaining mechanism 44, a portion of which selectively engages a portion of a container during transference of the container from the vehicle 18 to the trailer 22 so as to longitudinally secure the container with respect to the trailer 22. Prior to a further and more detailed discussion of the structures of the handling system 15 and their interrelationships, an overview of the preferred container manipulation method in furtherance of container delivery or dumping follows.

Figure 2:
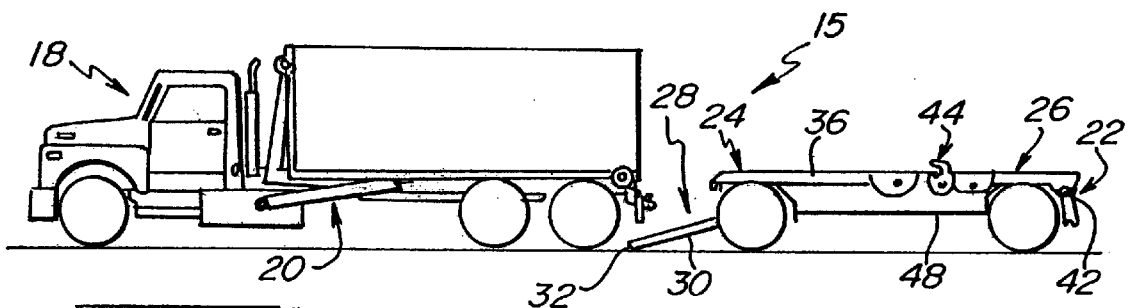
FIG. 2 depicts a container loaded vehicle adjacent a trailer adapted to receive the vehicle container.
Figure 3:
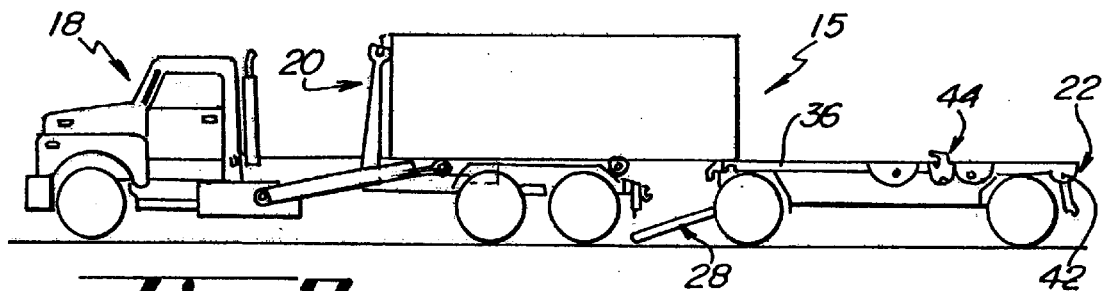
FIG. 3 depicts the general arrangement of FIG. 2 wherein transference of the vehicle container from the vehicle to the trailer has been initiated.
Figure 4:
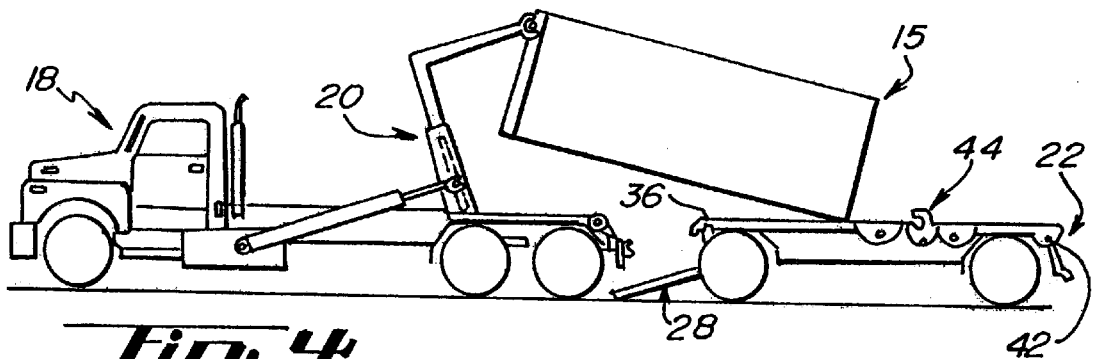
FIG. 4 depicts the general arrangement of FIG. 2 wherein transference of the vehicle container from the vehicle to the trailer is at a later time than that of FIG. 3.
Figure 5:
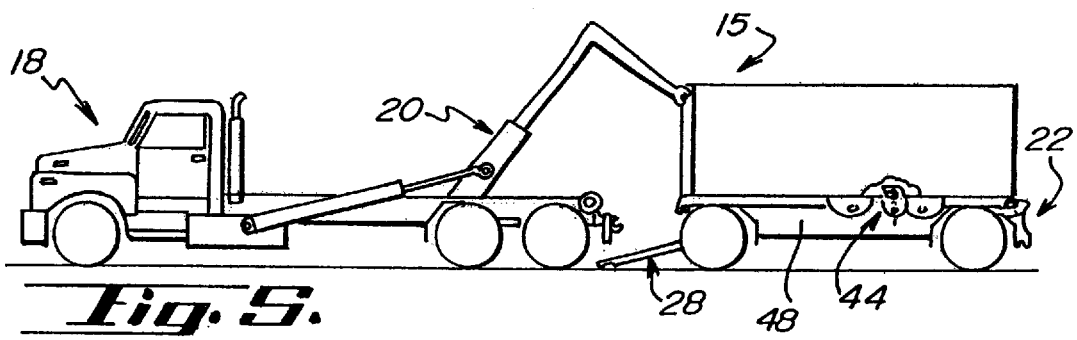
FIG. 5 depicts the arrangement of FIG. 2 wherein transference of the vehicle container from the vehicle to the trailer is at a later time than that of FIG. 4.

Tandem container loading, in contemplation of container delivery, is generally initiated by the loading of a container, via the vehicle hoist 20 (e.g., a hook type hoist, as shown in the figures), to the self propelled vehicle 18 as shown in FIGS. 1 and 2. Having been received on the vehicle 18, the container is transferred therefrom to the trailer 22 directly, as shown in FIGS. 3–5. The loaded vehicle 18 generally approaches the trailer 22 from the "front," closing the gap between the vehicle 18 and the forward portion 24 of the trailer 22, so as to be positioned within an operable range of the vehicle hoist 20 (FIG. 2). As is shown in FIGS. 2–5, the draw bar 30 of the hitch assembly 28 is positioned to be clear of the approaching vehicle 18, the "ground" position for the draw bar 30 permitting sufficient vehicle ingress relative to the trailer 22, more particularly the cradle 36 thereof, to assure certain transfer of the container from the vehicle 18 to the trailer 22 by the hook type hoist 20.

With reference to FIG. 3, the cradle 36 of the trailer 22 guidingly receives the container, more particularly the underside thereof, to laterally position the container on the cradle 36, and thereby laterally position same with respect to the trailer 22. As the container transitions from the vehicle 18 to the trailer 22 as further shown in FIG. 4, the container engages a portion of the container retaining mechanism 44 so as to longitudinally secure the container with respect to the trailer 22 vis-a-vis the cradle 36 as shown in FIG. 5. It is desirable that the container be secured, relative to the cradle 36, against rearward translation so as to insure proper longitudinal positioning of the container on the cradle 36, and to provide tethered retention of the container during dumping (i.e., container content unloading) operations. Upon transfer of the container from the vehicle 18 to the trailer 22, the vehicle 18 is "free" (i.e., available) to once again self-load a container using the vehicle hoist 20 (FIG. 1), and thereafter approach the container carrying trailer 22 for coupling therewith in furtherance of tandem container transport. The tandem connection is efficiently accomplished via actuation of the pivotable draw bar 30 as will be later detailed. In addition to eliminating the need for a separate trailer loading vehicle, the structures of the container handling system permit quick and efficient ingress/egress of the vehicle to/from the trailer, and thereby make possible container jockeying in confined or especially "busy" areas (i.e., scenarios where navigation may be difficult, unsafe, etc.) that otherwise are not possible or practicable.

Figure 6:
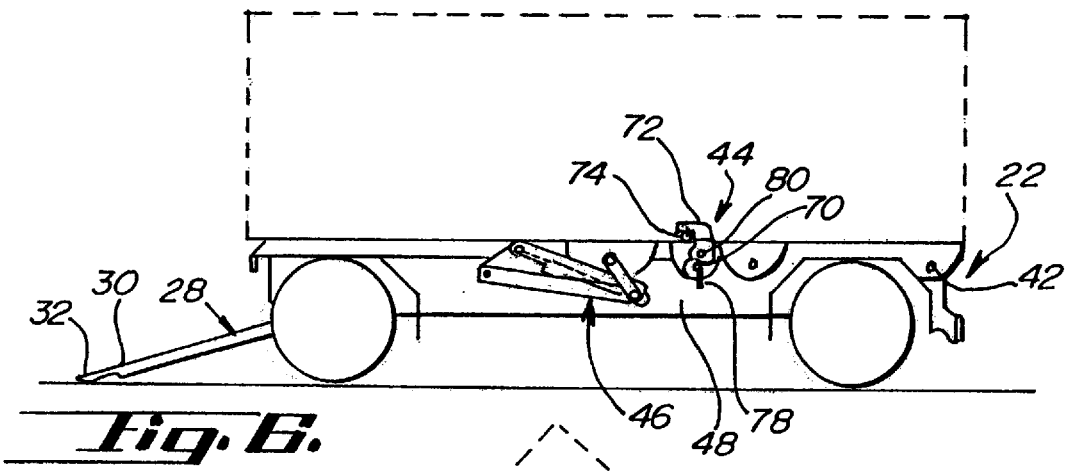
FIG. 6 depicts the trailer of the previous figures loaded with a container, particularly illustrating the trailer hoist and the container in a locked condition upon the cradle in furtherance of container content dumping.
Figure 7:
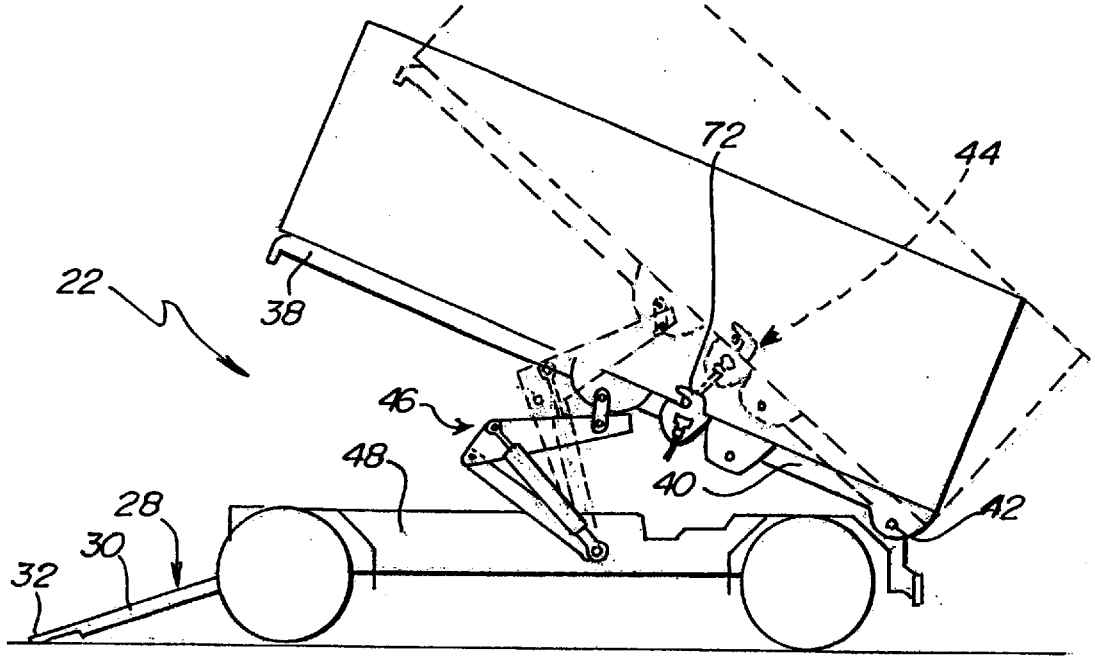
FIG. 7 depicts the trailer of FIG. 6 wherein the trailer hoist has been activated so as to elevate a portion of the cradle relative to the chassis of the trailer in furtherance of container content dumping.

Referring generally to FIGS. 6–9, the method of tandem container delivery is greatly enhanced, resulting in a significant time savings, by the container handling system of the subject invention as will be explained. As a preliminary matter, the trailer components of the handling system of FIGS. 6 and 7 show the retaining mechanism 44 configured to retain the container on the cradle 36 in furtherance of content dumping (i.e., a locked configuration or condition), whereas FIGS. 8 and 9 show the retaining mechanism 44 configured to permit container unloading from the cradle 36 (i.e., an unlocked configuration or condition). Although not illustrated, fluid linkages operably connect the vehicle and the trailer (e.g., hydraulic linkage for trailer hoist operation), with the hitch assembly preferably, but not necessarily (as shown), being joined to the vehicle during trailer unloading.

The trailer hoist 46 (e.g., scissor style) is generally operable via hydraulic linkage to the hydraulic controller of the vehicle, typical of those know to those of skill in hydraulic actuation. In addition to a hydraulic linkage, a pneumatic linkage, vis-a-vis trailer air brake actuation, is operable between the vehicle and the trailer so as to permit maintenance of trailer braking during receipt of a container from the vehicle during instances of transference, thereby providing trailer stability and during all phases of the operation.

Tandem container unloading preferably begins with trailer unloading, more particularly, disengaging the retaining mechanism 44 (FIG. 8) and activating the trailer hoist 46 so as to raise or elevate the cradle 36 of the trailer 22 past an angle of repose a (FIG. 9). With the apparatus of the subject invention, these tasks are accomplished while the vehicle and trailer are mechanically coupled via the hitch assembly, thus saving a great deal of time and operator energy otherwise diverted to unhooking and re-hooking the trailer in furtherance of heretofore known approaches to tandem container delivery. After discharging the container from the trailer 22, the trailer 22 may be unhitched from the vehicle, and the container carried by the vehicle discharged in a manner consistent with that shown in FIG. 1 (i.e., delivered from the vehicle to the adjacent ground surface for specific container placement at a job site), or, may be preferably remain hitched (i.e., in a tandem condition) and discharged in a manner consistent with that shown in FIGS. 2–5 (i.e., transferred from the vehicle to the trailer, for subsequent unloading as previously described). It should be appreciated that specific job site constraints dictate the option for container delivery.

Figure 10:
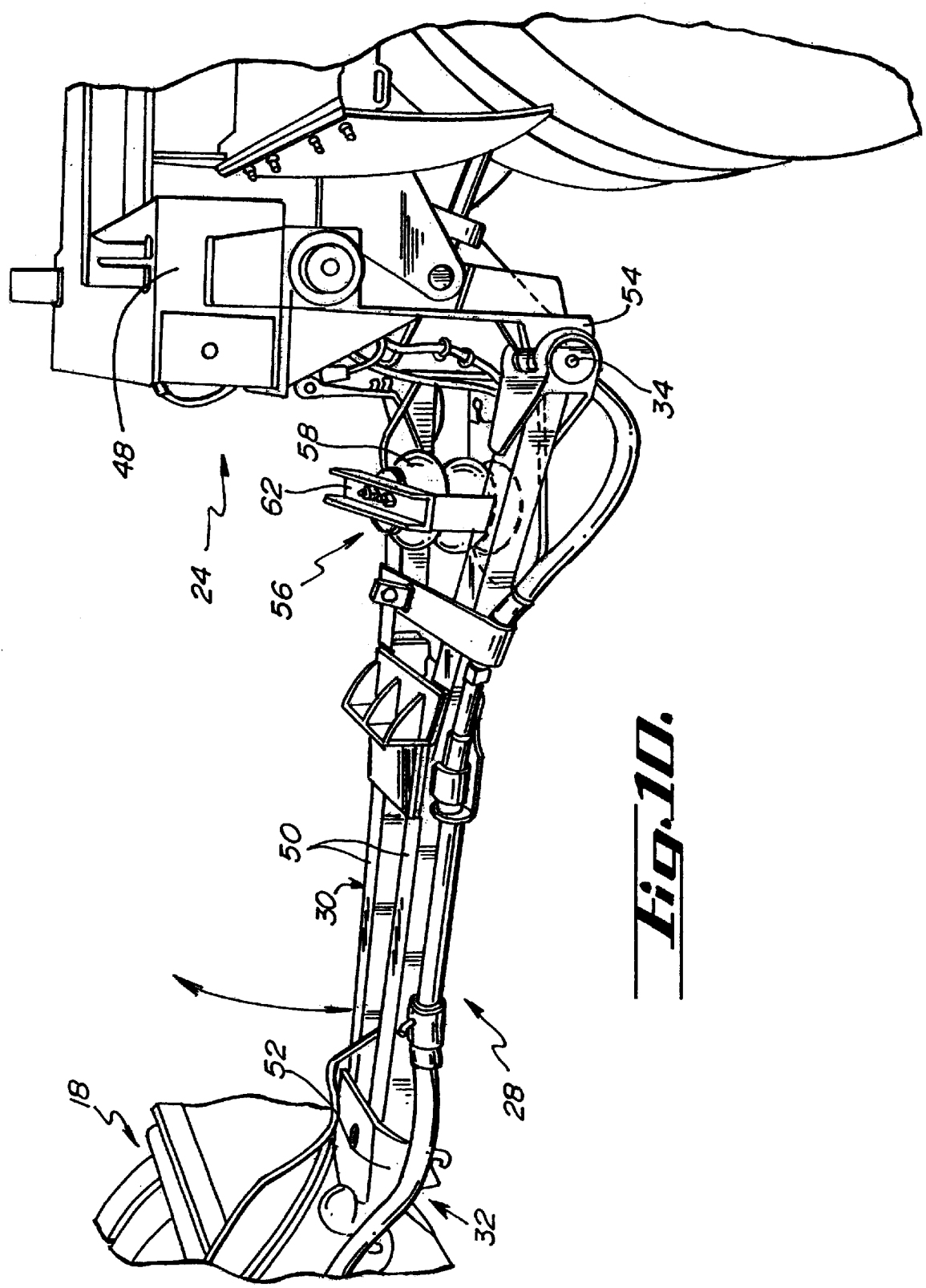
FIG. 10 is a side perspective view of the linking structure joining the vehicle (left) and the trailer (right)

With respect to the structures of the container handling system, and referring now to FIG. 10, a forward portion of the chassis 48 of the trailer 22 is shown equipped with the hitch assembly 28. The hitch assembly 28 generally includes the draw bar 30 having a spaced apart pair of arms 50, which, as shown, are generally forwardly converging. A mounting plate 52, adapted to receive a hitch hook, ball etc. of the vehicle 18, cooperatively unites the arms 50 at their forward most end. The opposing ends of the arms 50 are pivotably joined to the trailer 22, more particularly, to support members 54 of the forward portion of the trailer chassis 48. Both pneumatic and hydraulic delivery lines extend from the vehicle 18, to and along the draw bar 30, for linkage to corresponding pneumatic and hydraulic actuators as the case may be.

The hitch assembly 28 further includes a pneumatic actuator 56 interposed between the draw bar 30 and the forward portion of the chassis 48 such that the forward portion of the chassis 48 directs a pneumatic force developed by the pneumatic actuator 56, vis-a-vis a pneumatic source/controller, to a portion of the draw bar 30 for pivoting the draw bar 30 about the pivot axis 34. More particularly, a pneumatic bladder 58 pneumatically links a tongue 60 extending directly or indirectly from the trailer chassis 48 with a channel iron 62 that bridges the arms 50 of the draw bar 30. With particular reference to the motion arrows of FIG. 10, as fluid (e.g., air, oil, etc.) fills to expand the bladder 58, the distance between the tongue 60 and the channel iron 62 increases, thereby causing a partial clockwise rotation of the draw bar 30 about the pivot axis 34, resulting in a commensurate geometric raising of the mounting plate 52 relative to the ground surface. This feature greatly aids and speeds up manipulation of the generally heavy and cumbersome draw bar 30, thereby contributing to the overall container handling system efficiency.

Figures 11, 12:
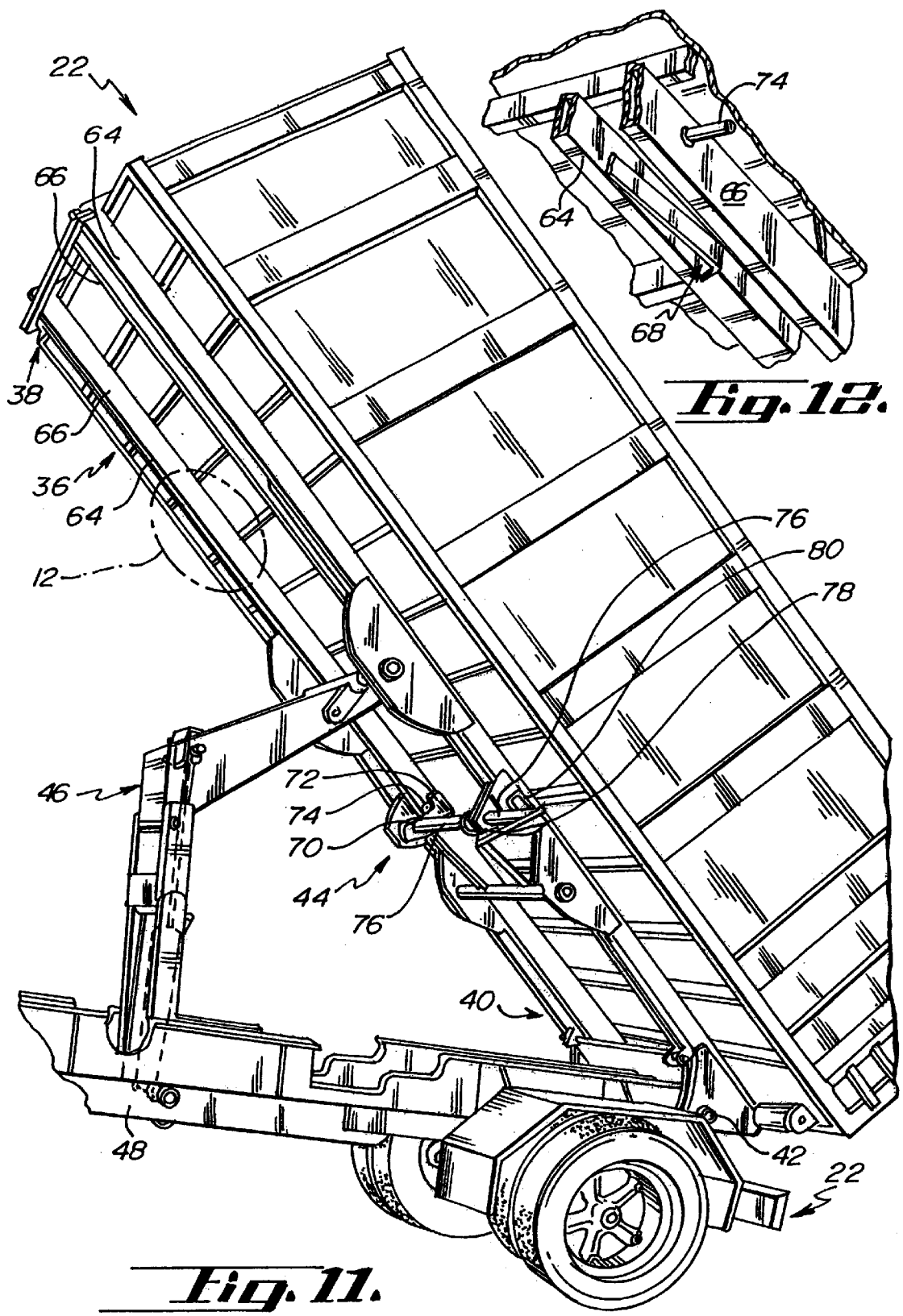
FIG. 11 is a partial side perspective view of the trailer (i.e., rearward portion) particularly showing the structures associated with the condition of FIG. 7; and, FIG. 12 is a detailed perspective view of the area so designated in FIG. 11.

Referring now to FIGS. 11 and 12, intermediately secured to the cradle 36 and the trailer chassis 48 in a conventional manner is the trailer hoist 46, preferably a scissor-type or style. The cradle 36 is further shown pivotably attached to the rearward portion of the trailer chassis 48, and in a raised or extended position.

Among its several features, the cradle 36 generally includes spaced apart arms 64 having a configuration suitable for cooperative engagement with the longitudinally traversing support members 66 typically associated with known containers. With particular reference to FIG. 12, wherein there is depicted a transitional condition for the container on the cradle, the arms 64 of the cradle 36 are preferably equipped with guide members 68 which facilitate proper lateral placement or positioning of the container on the trailer 22. Furthermore, the guide members 68, which effectively modify (i.e., reduce) the spaced apart condition (i.e., width) of the arms 64 within which the container support members 66 are received, laterally stabilize the container received on the cradle 36.

The cradle 36 is equipped with the container retaining mechanism 44 which generally traverses the cradle arms 64, and is effectively supported thereby. The mechanism 44 preferably includes a rotatable shaft 70 carrying at least one container engaging member 72, more particularly, a hook, angle iron, or other structure adapted to "catch" an arrest pin 74 or the like (see e.g., FIGS. 5–7) laterally extending from the structural members 66 of the container (see FIG. 12). The rotatable shaft 70 is received for rotation within a sleeve 76, or sleeve segments as shown, which are generally integral to or integrated with the cradle arms 64 directly, as by flanges, and/or indirectly as by cross bracing elements interposed between the arms. At least one end of the rotatable shaft 70 may include a hand hold 78, fashioned as bend or the like, so as to permit manual rotation thereof. The rotatable shaft 70 is adapted to be selectively secured against rotation, as by having a locking pin 80 which is selectively insertable through alignable apertures (not shown) in both the sleeve 76 and shaft 70. It is further contemplated that the shaft, more particularly the ability of the cradle to lockingly engage a portion of a container, be adapted for indirect actuation, as by known fluid switching or the like, in furtherance of selective locking/unlocking and/or rotation.

The container retaining mechanism 44 generally has first and second configurations, the first configuration permitting retention of a container on the trailer in furtherance of container content dumping, as shown in FIGS. 7 and 12, the second configuration permitting container unloading from the trailer as shown in FIGS. 8 and 9. The first configuration requires that the locking pin 80 be received through the cooperating apertures of the sleeve 76 and the shaft 70. With this arrangement, the hook 72 of the shaft 70 is oriented to engage (i.e., catch) the arrest pin 74 of the container and thereby prevent rearward translation of the container on the cradle 36. In addition to assisting in content dumping, this configuration helps longitudinally position the container on the trailer during container transference from the vehicle to the trailer. When circumstances warrant unloading a container from the trailer, the second configuration for the retaining mechanism 44 is obtained by withdrawal of the locking pin 80 prior to elevating the cradle for container delivery.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. A handling system for a container of the type having a bottom and a plurality of walls that extend therefrom to form an enclosure, the handling system comprising:
    a. a vehicle, said vehicle configured to carry a container, said vehicle being equipped with a hoist for loading and unloading a container therefrom; and,
    b. a trailer, said trailer configured to receive a container from said vehicle via said vehicle hoist when said trailer and said vehicle are in substantial linear alignment with each other, said trailer configured to freely and slidably receive a container from the vehicle along the container bottom, the trailer comprising a hoist configured to selectively manipulate a received container, whereby either a container and its contents, or only the contents of a container may be unloaded from the trailer.

2. The handling system for a container of claim 1, wherein said trailer is equipped with a hitch assembly for removably coupling said trailer to said vehicle.

3. The handling system for a container of claim 2, wherein said hitch assembly includes a draw bar having a free end, the draw bar pivotable about a pivot axis.

4. The handling system for a container of claim 3, wherein said hitch assembly further comprises an actuator, with said actuator arranged and configured to pivot said draw bar about said pivot axis so as to selectively position said free end of said draw bar relative to said vehicle and thereby facilitate coupling of said trailer thereto.

5. The handling system for a container of claim 4, wherein said actuator is interposed between said draw bar and a member of said trailer.

6. The handling system for a container of claim 1, wherein said trailer hoist is operatively connected to a cradle for receiving a container along the container bottom.

7. The handling system for a container of claim 6, wherein said cradle comprises a guide member for cooperative engagement with a container bottom to facilitate lateral positioning and stabilization of a container on said trailer.

8. The handling system for a container of claim 6, wherein said cradle comprises a container retaining mechanism for selectively coupling a container to said cradle and preventing unintended longitudinal movement of a container with respect thereto.

9. The handling system for a container of claim 8, wherein said container retaining mechanism comprises at least one positionable container engaging member.

10. The handling system for a container of claim 9, wherein said container engaging member may be lockably secured in at least one preselected position.

11. The handling system for a container of claim 10, wherein said container engaging member is a hook.

12. The handling system for a container of claim 8, wherein said container retaining mechanism is movable between first and second positions, wherein said first position permits unloading of the contents of a container while the container is retained on said trailer.

13. The handling system for a container of claim 8, wherein said container retaining mechanism is movable between first and second positions, wherein the second position permits the unloading of a container from said trailer.

14. The handling system for a container of claim 6, wherein the cradle is pivotally attached to the trailer, whereby the cradle may be pivoted by the hoist to unload either the container or the contents of the container from the trailer.

15. The handling system for a container of claim 1, wherein the trailer comprises a container retaining mechanism for selectively coupling a container to said trailer and preventing unintended movement of a container with respect thereto.

16. The handling system for a container of claim 15, wherein the container retaining mechanism selectively couples a container to said trailer from a position below the bottom of the container.

17. A method of unloading a tandem container transport of the type comprising a vehicle having a first container hoist and a first container, with the first container positioned on the vehicle by the first container hoist and releasably secured to the vehicle, the vehicle coupled to a trailer having a second container hoist, a container retaining mechanism for selectively securing a second container positioned on the trailer, and a second container, the method of unloading a tandem container transport comprising the steps of: p1 a. actuating the container retaining mechanism of the trailer to selectively disengage the second container from securement to the trailer; and, b. unloading the second container from the trailer using the second container hoist.

18. The method of unloading a tandem container transport of claim 17, further comprising the step of:

c. uncoupling the trailer from the vehicle.

19. The method of unloading a tandem container transport of claim 18, further comprising the step of:

d. releasing the first container from securement to the vehicle; and e. unloading the first container from the vehicle using the first container hoist.

20. A method of unloading a tandem container transport of the type comprising a vehicle having a first container hoist and a first container, with the first container positioned on the vehicle by the first container hoist and releasably secured to the vehicle, the vehicle coupled to a trailer having a second container hoist, a container retaining mechanism for selectively securing a second container positioned on the trailer, and a second container, the method of unloading a tandem container transport comprising the steps of:

a. actuating the container retaining mechanism of the trailer to selectively engage and secure the second container to the trailer; and, b. unloading the contents of the second container from the trailer using the second container hoist.

21. The method of unloading a tandem container transport of claim 20, further comprising the step of:

c. uncoupling the trailer from the vehicle.

22. The method of unloading a tandem container transport of claim 21, further comprising the steps of:

d. releasing the first container from securement to the vehicle; and e. unloading the first container from the vehicle using the first container hoist.

23. A tandem container transport system comprising:

a vehicle, the vehicle having a load bed configured to support a container from below, the vehicle having a first hoist configured to be able to lift a container upwardly and slidingly position it onto the vehicle load bed, the first hoist further configured to be able to lift a container upwardly and slidingly move the container off of the vehicle load bed; and, a trailer, the trailer having a load bed configured to slidingly receive and support a container from below, the trailer having a second hoist configured to be able to unload a container from the load bed of the trailer;

whereby the first hoist of the vehicle may lift and slide a container onto vehicle load bed, the first hoist may lift and slide the container from the vehicle load bed onto the trailer load bed; and the trailer may unload the container from the trailer load bed using the second hoist.

* * * * *